(12) United States Patent
Ballou

(10) Patent No.: US 7,921,154 B2
(45) Date of Patent: Apr. 5, 2011

(54) SYSTEM AND METHOD OF LIVE DATA SEARCH ON A MOBILE DEVICE

(75) Inventor: Lawrence Kirk Ballou, Rowlett, TX (US)

(73) Assignee: Flash Widgets, L.L.C., Rowlett, TX (US)

( * ) Notice: Subject to any disclaimer, the term of this patent is extended or adjusted under 35 U.S.C. 154(b) by 175 days.

(21) Appl. No.: 11/780,339

(22) Filed: Jul. 19, 2007

(65) Prior Publication Data

US 2008/0045190 A1 Feb. 21, 2008

Related U.S. Application Data

(60) Provisional application No. 60/838,154, filed on Aug. 17, 2006, provisional application No. 60/896,432, filed on Mar. 22, 2007.

(51) Int. Cl.
G06F 15/16 (2006.01)
G06F 7/00 (2006.01)

(52) U.S. Cl. ........ 709/203; 707/621

(58) Field of Classification Search .......... 709/203; 707/621
See application file for complete search history.

(56) References Cited

U.S. PATENT DOCUMENTS

| | | | | |
|---|---|---|---|---|
| 5,768,581 | A * | 6/1998 | Cochran | 707/741 |
| 6,377,965 | B1 * | 4/2002 | Hachamovitch et al. | 715/203 |
| 6,385,602 | B1 * | 5/2002 | Tso et al. | 707/3 |
| 6,501,999 | B1 | 12/2002 | Cai | |
| 6,564,213 | B1 * | 5/2003 | Ortega et al. | 1/1 |
| 6,799,264 | B2 | 9/2004 | Goodhue et al. | |
| 7,647,312 | B2 * | 1/2010 | Dai | 707/999.004 |
| 7,724,156 | B2 * | 5/2010 | Park et al. | 341/22 |
| 2002/0042265 | A1 | 4/2002 | Kumaran et al. | |
| 2004/0024751 | A1 * | 2/2004 | Petrisor et al. | 707/3 |
| 2004/0165593 | A1 | 8/2004 | Klotz | |
| 2004/0229609 | A1 | 11/2004 | Yamaguchi | |
| 2004/0254928 | A1 * | 12/2004 | Vronay et al. | 707/5 |
| 2006/0026064 | A1 * | 2/2006 | Collins | 705/14 |
| 2006/0156233 | A1 * | 7/2006 | Nurmi | 715/532 |
| 2006/0253427 | A1 * | 11/2006 | Wu et al. | 707/3 |
| 2006/0259479 | A1 * | 11/2006 | Dai | 707/4 |

(Continued)

FOREIGN PATENT DOCUMENTS

EP 1653376 A2 * 5/2006

OTHER PUBLICATIONS

Chang, Eric, et al., "Efficient Wed Search On Mobile Devices with Multi-Modal Input and Intelligent Text Summarization", Proc. of the 11th International World Wide Web Conference (c), 2002, pp. 1-4.*

(Continued)

*Primary Examiner* — Krisna Lim
(74) *Attorney, Agent, or Firm* — Haynes and Boone, LLP

(57) ABSTRACT

A method of communicating from a mobile device using a computer program is provided. The method includes communicating a keystroke to a remote server via a network upon detecting the keystroke in a text input area of a user-interface page; receiving data from the remote server via the network in response to the remote server processing the keystroke; and displaying on the mobile device at least a portion of the data on the user-interface-page by reloading less than the entire user-interface page. Computer code and a system are also provided.

28 Claims, 3 Drawing Sheets

U.S. PATENT DOCUMENTS

2007/0156747 A1 7/2007 Samuelson et al. ........... 707/102
2009/0228838 A1 9/2009 Ryan et al.

OTHER PUBLICATIONS

Buyukkokten, Orkut, et al., "Accordion Summarization for end-game browsing on PDAs and Cellular Phones", CHI 2001, Seattle, WA, Mar. 31-Apr. 5, 2001, pp. 213-220.*

Jones, Steve, et al., "Using Keyphrases as Search Result Surrogates on Small Screen Devices", Personal and Ubiquitous Computing, vol. 8, Issue 1, Feb. 2004, pp. 55-68.*

Aridor, Yariv, et al., "Knowledge Encapsulation for Focused Search from Pervasive Devices", ACM Transactions on Information Systems, vol. 20, No. 1, Jan. 2002, pp. 25-46.*

Wang, Fei-Yue, et al., "An Application Specific Knowledge Engine for Researches in Intelligent Transportation Systems", 2004 IEEE Intelligent Transportation Systems Conference, Washington, DC, Oct. 3-6, 2004, pp. 841-846.*

Google Suggest, at http://labs.google.com/suggest (Aug. 11, 2006).

http://www.engadget.com/2004/12/11/google-suggest-the-movie-no-mobile-version-yet/ (Aug. 11, 2006).

http://www.jkontherun.blogs.com/kjontherun/2004/12/google_suggest_.html (Aug. 11, 2006).

Flash Release Notes—Macromedia Flash MX 2004 and Flash MX Professional 2004 Release Notes, 2004, 18 pages http://www.adobe.com/support/documentation/en/flash/mx2004/releasenotes.html#sysreqs.

Loading External XML formatted Content into Flash MX 2004, Sep. 9, 2005, 6 pages http://www.actionscript.org/resources/articles/56/1/Loading-External-XML-formatted-Content-into-Flash-MX-2004/Page1.html.

Flash Lite versions, 1.1, 2.0, 2.1, 3.0, 3.1, 4.0, 4.1, 4.2, Nokia, 2010, 8 pages http://library.forum.nokia.com/index.jsp?topic=/Flash_Lite_Developers_Library/GUID-1AC6597B-254E-449E-A0B4-DA4CE41E2903.html.

* cited by examiner

SYSTEM AND METHOD OF LIVE DATA SEARCH ON A MOBILE DEVICE

CROSS-REFERENCE TO RELATED APPLICATION

This application claims the benefit of co-pending U.S. Provisional Patent Application Nos. 60/838,154, filed Aug. 17, 2006, and 60/896,432, filed Mar. 22, 2007, the entire contents of each of which is hereby incorporated herein by express reference thereto.

FIELD OF INVENTION

This invention enables a mobile device to perform a remote operation via a network, for example, a wireless network, in response to each keystroke made on the mobile device. The invention further enables the network device to render or display results obtained via the network in response to the keystroke on a display of the mobile device.

BACKGROUND OF THE INVENTION

Presently, an entire phrase or keyword needs to be entered and submitted on a mobile device before a search request and its associated search results are displayed on the mobile device. Some conventional searching methods present users with a list of popular searches to minimize data entry time, while others describe category-based searches to help narrow down search possibilities before the user performs a keyword or phrase entry for their specific search. These methods of searching require several keystrokes before any results are displayed.

Comparable suggestive search engines are available for desktop-based web-browsing and applications. See, for example, Google Suggest at <http://labs.google.com/suggest> (Aug. 11, 2006). These search engines, however, do not operate on mobile devices and are not easily transferable, in part because they are adapted for use with a full desktop or laptop computer keyboard for input. Other examples of conventional searching on mobile devices includes, for example, <http://www.engadget.com/2004/12/11/google-suggest-the-movie-no-mobile-version-yet/> (Aug. 11, 2006) and <http://jkontherun.blogs.com/jkontherun/2004/12/google_suggest_.html> (Aug. 11, 2006

In contrast to a desktop device, programming and developing applications for a mobile device requires many special considerations and involves many limitations. A mobile device application typically requires a small executable size or footprint. The network bandwidth available to mobile devices can be limited, especially in wireless or cellular environments, or other shared network environments. Network communication to and from a mobile device application typically requires data compression to provide acceptable user response times. Protocols used to transfer data to and from a mobile device typically also are designed to be small and require little overhead.

Compared to desktops, mobile devices typically have limited memories and CPUs. A mobile device's host operating system usually provides a much smaller set of services to applications as compared to services provided by a desktop operating system. Further complications arise in developing for a mobile device just by the huge variety and limited life-spans of mobile devices.

Despite existing search tools on mobile devices, there exists a need for improved searching mechanisms by a user on a mobile device.

SUMMARY OF THE INVENTION

The invention relates to methods of communicating from a mobile device using a computer program by communicating a keystroke to a remote server via a network upon detecting the keystroke in a text input area of a user-interface page, receiving data from the remote server via the network in response to the remote server processing the keystroke, and displaying on the mobile device at least a portion of the data on the user-interface-page by reloading less than the entire user-interface page. In a preferred embodiment, the keystroke conveys a displayable character. In a more preferred embodiment, the displayable character includes an alpha-numeric character.

In one embodiment, the network includes a telecommunications wireless network. In another embodiment, the mobile device includes a handheld computer device that communicates via the network using one or more radio frequencies. In a preferred embodiment, the handheld device includes at least one of a wireless phone, a Blackberry device, a personal desktop assistant, and a pocket personal computer. In another embodiment, the mobile device includes computer code that includes AJAX, Adobe FLASH, Adobe FLASH LITE, or a combination thereof.

In one embodiment, the communicating of the keystroke and the receiving of the data use asynchronous communications. In another embodiment, the method further includes repeating the communicating, the receiving, and the displaying. In a preferred embodiment, the repeating is terminated when the detected keystroke includes a submit command keystroke.

In another embodiment, the user-interface-page includes a suggestive search page and the displayed portion of the data includes predictive key words or phrases. In a preferred embodiment, the displayed portion of the data includes an estimated count of search results. In several more preferred exemplary embodiments, the search page searches at least one of a web-page keyword, a directory, a dictionary, a product listing, a news feed, a games listing, a movie theater listing, a movie rental listing, a phone directory, a ring tone listing, a video rental listing, a classified advertisement, or a combination thereof. In another embodiment, the data is formatted using a mark-up language. In yet another embodiment, the user-interface page includes a web-page and the remote server includes a web-server.

In one embodiment, the received data includes results from at least two associated databases. In a preferred embodiment, a first database includes general search result information and a second database includes sponsored search result information. In yet another preferred embodiment, the displayed portion of the data includes a plurality of sponsored information and general information. In each of these embodiments, preferably the displayed portion of the data is ranked, e.g., by a pre-selected pattern or value, and then displayed by rank. In one embodiment, the handheld device includes a wireless phone and the method further includes selecting a desired portion of the data that includes a person or a business and asynchronously communicating a second keystroke to initiate a wireless telephone call thereto.

The invention also relates to methods of communicating from a mobile device using a computer program by asynchronously communicating a keystroke to a remote server via a network upon detecting the keystroke in a text input area of a suggestive search page, asynchronously receiving data from the remote server via the network in response to the remote server processing the keystroke, and displaying on the mobile device a portion of the data on the suggestive search page by reloading less than the entire suggestive search page. In one preferred embodiment, the displayed portion of the data includes one or more predictive key words or phrases.

In a preferred embodiment, the detected keystroke includes a mouse event, a window selection, or a keystroke. In yet another preferred embodiment, the remote server compresses the data prior to being received by the mobile device.

The invention also relates to a computer program product that includes a computer readable medium having computer program code embodied in the medium, wherein the program code includes: computer code for communicating a keystroke to a remote server via a network upon detecting the keystroke in a text input area of a user-interface page, computer code for receiving data from the remote server via the network in response to the remote server processing the keystroke, and computer code for displaying on the mobile device at least a portion of the data on the user-interface-page by reloading less than the entire user-interface page.

The invention further encompasses a computer program product that includes a computer readable medium having computer program code embodied in the medium, wherein the program code includes: computer code for asynchronously communicating a keystroke to a remote server via a network upon detecting the keystroke in a text input area of a suggestive search page, computer code for asynchronously receiving data from the remote server via the network in response to the remote server processing the keystroke, and computer code for displaying on the mobile device a portion of the data on the suggestive search page by reloading less than the entire suggestive search page.

The invention also relates to a system including: a mobile device that includes a suggestive search page including a text input area and a data grid display to display a portion of the data on the suggestive search page by reloading less than an entire suggestive search page, and a keystroke detection function adapted to transmit the keystroke instantly via a network, and a server including a network interface adapted to asynchronously receive the keystroke from the mobile device, and a processor to gather data in response to the keystroke, form a packet from the data, and direct the network device to asynchronously send the data via the network interface.

Each of the embodiments should be understood to apply to each of the broad aspects of the invention.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which.

DETAILED DESCRIPTION OF THE PREFERRED EMBODIMENTS

Figure 1:
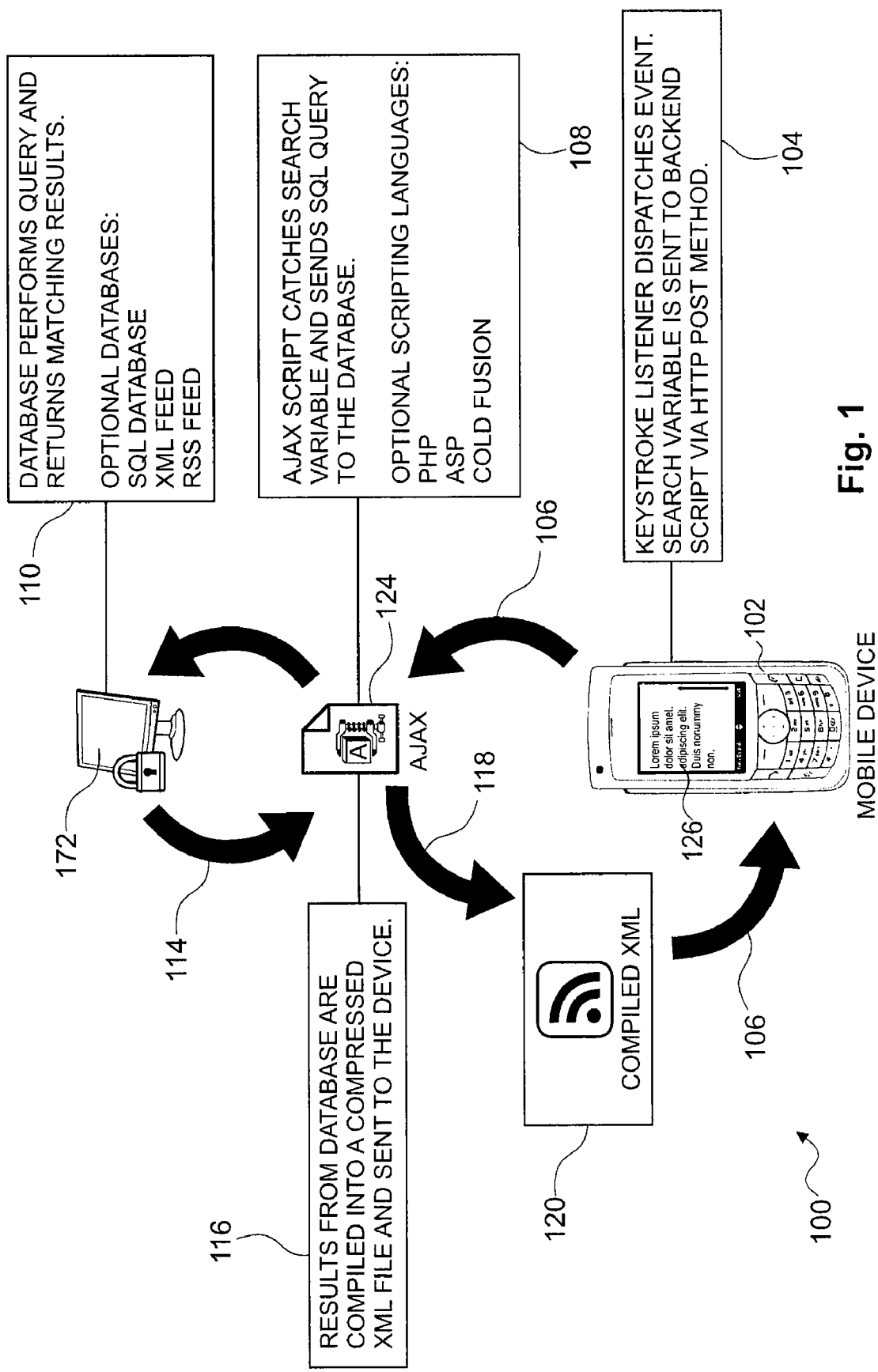
FIG. 1 is a functional block diagram and components of an illustrative system for providing a suggestive search page and results in accordance with one embodiment of the present invention.

This invention allows mobile device users to more rapidly narrow down their search results as they type or otherwise enter data on a mobile device input system, thus minimizing keystrokes, decreasing the time necessary to conduct searches, and greatly enhancing the user experience. Applicant believes that this is the first search application for a mobile device to generate results for each keystroke the user performs, preferably without need for a submit command after each keystroke. An exemplary implementation of the invention includes performing instant internet searches per keystroke on a web-enabled mobile device, where results or suggestions to complete a search string are displayed as a user enters each of the keystrokes. This search engine can parse data from one or more web-based data repositories and/or streams, for example, SQL databases, XML and RSS feeds, or a combination thereof. This search application can greatly increase the usability of internet-based searches by decreasing the amount of keystrokes and time required to search on a mobile device.

The time required to type in conventional web-based searches on mobile devices previously took far too long to make web-based search applications a viable commercial product. Any form of web-based search can be optimized by this search engine of the invention. The potential uses include, for example, directory searches, phone directory searches, product listings, news feeds, games listings, movie theater listings, movie rental searches, white pages, yellow pages, ring tones, audio rentals, video rentals, classified advertisements, or any other web-based search that uses keystrokes for input.

A method of communicating from a mobile device using a computer program is provided. The method includes: communicating a keystroke to a remote server via a network upon detecting the keystroke in a text input area of a user-interface page; receiving data from the remote server via the network in response to the remote server processing the keystroke; and displaying on the mobile device at least a portion of the data on the user-interface-page by reloading less than the entire user-interface page.

In some embodiments, the method can include repeating the communicating, the receiving, and the displaying. The repeating can be terminated when the detected keystroke includes a submit command keystroke.

In some embodiments, the keystroke can convey a displayable character. The displayable character preferably includes an alpha-numeric character. The detected submit command keystroke can include a mouse event, a window selection, a keystroke, or even the press of a button or wheel.

The network can include a telecommunications wireless network. The remote server can compress the data prior to being received by the mobile device. The mobile device can include a handheld computer device that communicates via the network using one or more radio frequencies. Other forms of electromagnetic emissions, such as, infra-red or lasers, can also be used to provide wireless communication to and from a mobile device, however, radio frequencies are preferred. The communicating of the keystroke can use asynchronous communications. The receiving of the data can use asynchronous communications. Preferably, both the communicating and receiving use asynchronous communications.

The handheld device can include at least one of a wireless phone, a Blackberry device, a personal desktop assistant, and a pocket personal computer. The mobile device can include computer code that includes AJAX, Adobe FLASH, Adobe FLASH LITE, or a combination thereof.

The user-interface-page can include a suggestive search page. The displayed portion of the data can include one or more predictive key words or phrases. The displayed portion of the data can include an estimated count of search results. The search page can search at least one of a web-page keyword, a directory, a dictionary, a product listing, a news feed, a games listing, a movie theater listing, a movie rental listing, a phone directory, a ring tone listing, a video rental listing, a classified advertisement, or a combination thereof. Various other search applications can be readily envisioned and each of these types of searches available to those of ordinary skill in the art can be achieved on a mobile device according to the present invention.

In some embodiments, the data is formatted using a mark-up language, e.g., XML. The user-interface page can include a web-page. The remote server can include a web-server.

A preferred method of communicating from a mobile device using a computer program is provided. The method includes: asynchronously communicating a keystroke to a remote server via a network upon detecting the keystroke in a text input area of a suggestive search page; asynchronously receiving data from the remote server via the network in response to the remote server processing the keystroke; and displaying on the mobile device a portion of the data on the suggestive search page by reloading less than the entire suggestive search page.

A computer program product, including a computer readable medium having computer program code embodied in the medium is provided. The program code can include: computer code for communicating a keystroke to a remote server via a network upon detecting the keystroke in a text input area of a user-interface page; computer code for receiving data from the remote server via the network in response to the remote server processing the keystroke; and computer code for displaying on the mobile device at least a portion of the data on the user-interface-page by reloading less than the entire user-interface page.

A computer program product, including a computer readable medium having computer program code embodied in the medium is provided. The program code includes: computer code for asynchronously communicating a keystroke to a remote server via a network upon detecting the keystroke in a text input area of a suggestive search page; computer code for asynchronously receiving data from the remote server via the network in response to the remote server processing the keystroke; and computer code for displaying on the mobile device a portion of the data on the suggestive search page by reloading less than the entire suggestive search page.

In some embodiments a system including a mobile device and a server is provided. The mobile device can include a suggestive search page including, for example, a text input area and a data grid display to display a portion of the data on the suggestive search page by reloading less than an entire suggestive search page, and a keystroke detection function adapted to transmit the keystroke instantly via a network. The server can include a network interface adapted to asynchronously receive the keystroke from the mobile device, and a processor to gather data in response to the keystroke, form a packet from the data, and direct the network device to asynchronously send the data via the network interface.

As seen in FIG. 1, a user can access a web-based search page 126 on a mobile device 102 via a network 106. A keystroke listener 104 can dispatch events such as keystroke. The search variable can be sent to a backend script on a remote server, for example, via the HTTP POST method. The keystroke listener 104 can be a client of an AJAX script 124 that can be resident on a remote server 112. The remote server 112 can access a database 110 to perform queries and return matching search results. The AJAX script 124 can be adapted to access, e.g., one or more SQL databases, an XML feed, or an RSS feed, or a combination thereof.

Upon obtaining the results, via a inter-process communication interface, via a network interface 114, or as the result of a function call, the AJAX script 124 can generate a compiled XML 120. The compiled XML 120 can be optionally compressed 116. The compiled XML 120 can be generated and written directly to a stream 118 that can for example, be the same stream where a HTTP POST response needs to be written to be transmitted back to the mobile device 102. The compiled XML 122 is received by the network interface 106, operating in a receive mode. The mobile resident script that is invoked or is part of the web-based search page 126 can display the results.

Figure 2C:
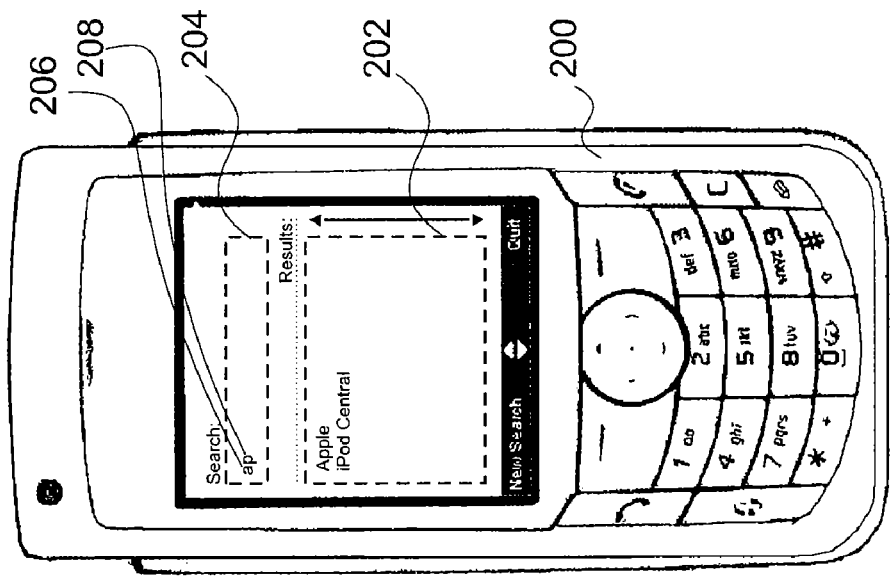
FIGS. 2a, 2b, and 2c are illustrations of a mobile device running an application in accordance with one embodiment of the present invention.
Figure 2B:
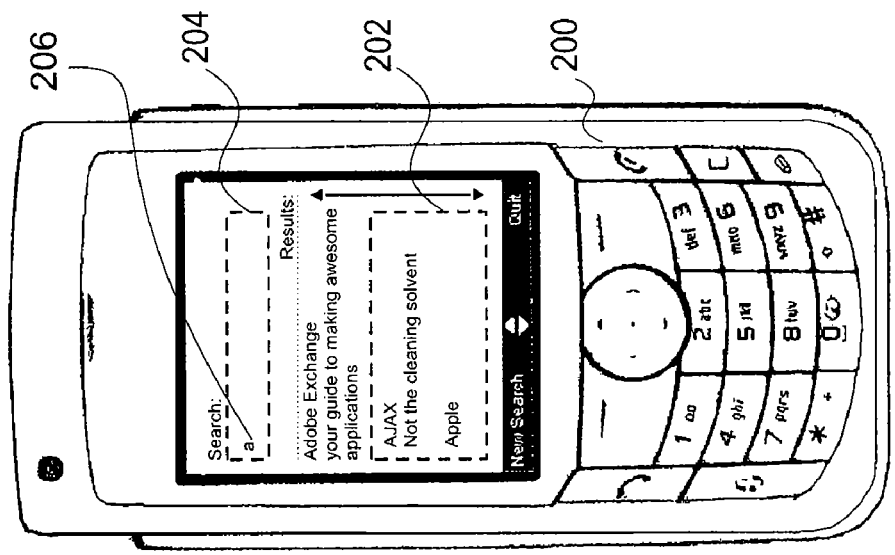
Figure 2A:
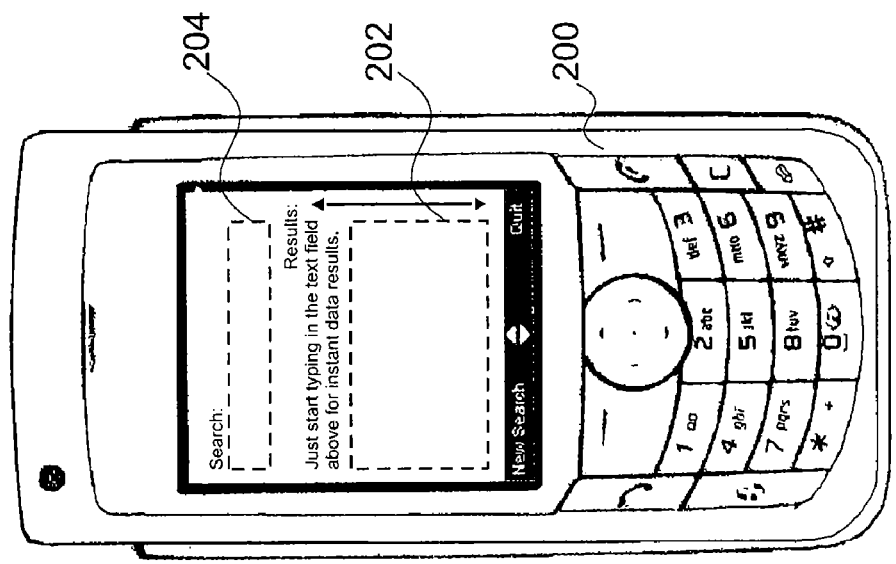

As seen in FIGS. 2a-2c, a mobile device 200 can display a data grid 202 to display search results for keystrokes entered into a text input 204. As seen in FIG. 2b, a user enters a first keystroke 206 including the letter "a." The data grid 202 is updated with search results or data associated with the letter "a." In some embodiments, the search results can be displayed alphabetically. In other embodiments, the search results can be ordered by some other criterion, for example, by displaying local site search results first, by displaying paid advertiser's search results first, or by other sorting characteristics available to those of ordinary skill in the art. As seen in FIG. 2c, when the user enters a second keystroke 208 including the letter "p," the data grid 202 is updated with search results narrowed by the second keystroke 208.

Figure 3:
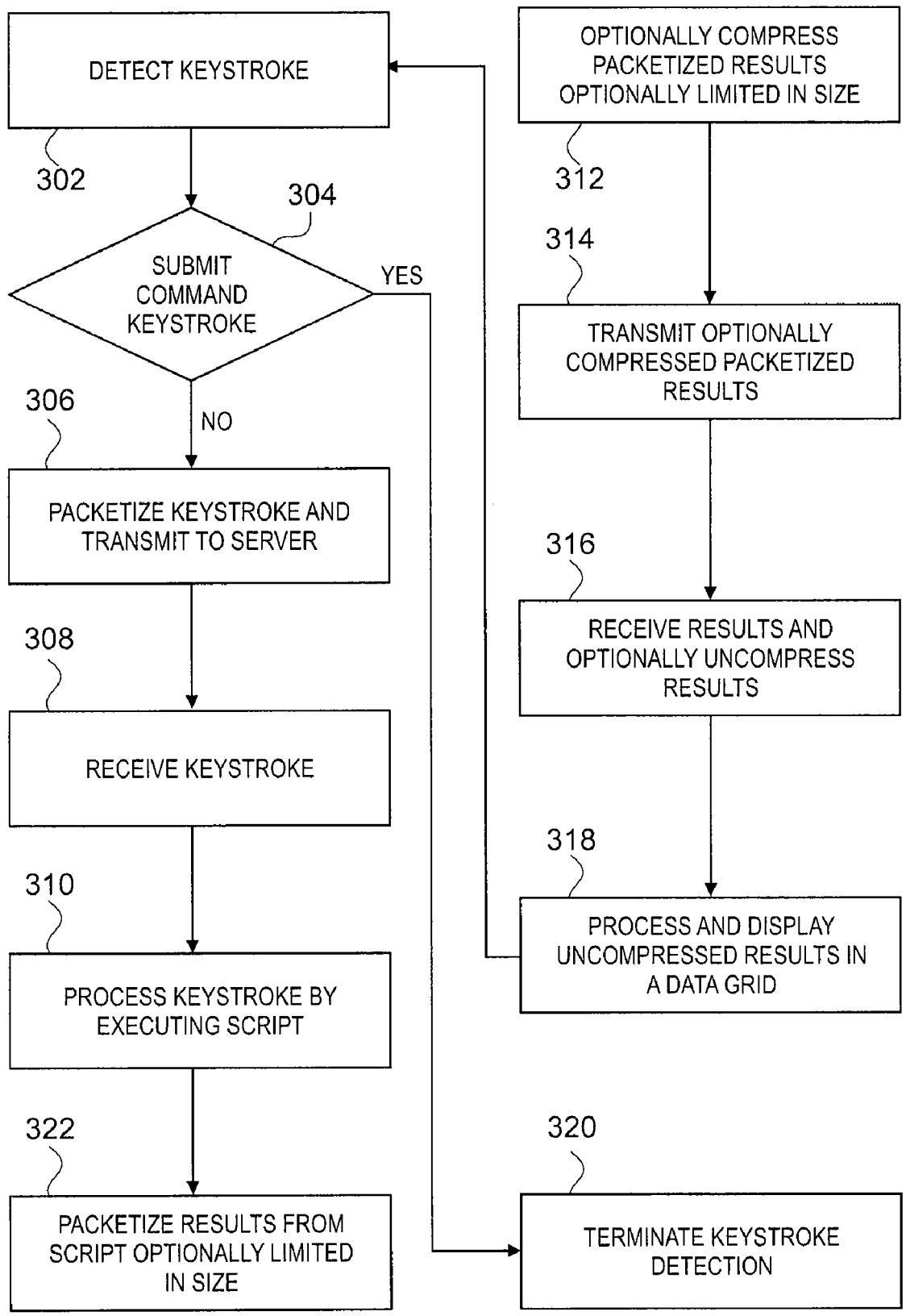
FIG. 3 is a functional block diagram in accordance with one embodiment of the present invention.

FIG. 3 is a functional diagram 300 of one embodiment of the present invention. A mobile device resident script can detect each keystroke 302. If the script detects a submit command keystroke 304 (YES), the script can be adapted to execute a terminate keystroke detection 320 function, that can, for example, select a search result highlighted by the user and submit a web request based on the highlighted search result. If the script does not detect a submit command keystroke 304 (NO), the script packetizes the keystroke, for example as an HTTP POST, and transmits the packetized keystroke 306 to a remote server. The server receives the keystroke 308 and processes the keystroke by executing a server-side or backend script 310. The results of the server-side script can be packetized, for example in a XML format, that can optionally be limited to a desired, pre-selected maximum size 322 if desired to be more compatible with mobile services capabilities. The server-side script can optionally compress the packetized results, again optionally limiting the compressed results to a maximum size 312. The remote server than transmits the optionally compressed packetized results 314 to the mobile device that requested the search. The mobile device receives the results and the results are uncompressed 316, if necessary. The results are processed, for example, by the same client-side script that transmitted the keystroke to the remote server, and displayed in a data grid 318. The mobile device script than continues processing with the detect keystroke 302, and repeats the necessary steps. If for some reason, a user has entered more than one keystroke while the mobile device script is receiving, processing, and displaying the results, the next request sent to the remote server can include all keystrokes entered by the user in the interim.

In other embodiments, an application providing a user-interface page can be resident on a mobile device, and the application can be adapted to transmit each keystroke to a remote server via a network. A mobile device resident application can also use web-based or type-network communications to provide the functionality described herein for the present invention.

The invention can be practiced on any web-enabled handheld device, for example, mobile phones, PDAs, smart phones, regular cell phones, or Blackberry devices. The handheld devices can fit in a palm, can fit on a wrist, or can be even smaller. In some embodiments, a mark-up language can be used as protocol to communicate data to and from the mobile device to the server.

In one embodiment, HTML can be used to communicate to and from a mobile device. In HTML terminology, a variable or parameter is sent to a remote server in a format where "value" includes one or more of the keystrokes. In some embodiments, the value can comprise all the keystrokes entered into a text input box concatenated together. In other embodiments, the value can comprise only the last keystroke entered in a text input box.

Upon receiving the keystroke, the web-server can invoke a server side application or script. The server side script can format the value into a SQL query script to obtain search results. In other embodiments, the script can parse or filter though a byte stream, for example, an XML or RSS feed. The script results can include data to be sent back to the mobile device.

Data received by a mobile device can be rendered using a style sheet, for example, a mobile device resident XML object, a server resident XML object that is downloaded to the mobile device. An JavaScript, JAVA or NET based application on the mobile device can executes a function for each event such as a keystroke, communicate the keystroke to a server and renders the results received from the server.

The data can be compiled into a dynamic data stream, for example, a dynamic XML stream, prior to being sent to the mobile device. This functionality can be implemented, for example, by a programming technique or methodology known as Asynchronous JavaScript and XML (AJAX) in the art. By using the AJAX programming methodology, a user interface can execute a JavaScript function in a web-page for each detectable event, such as a keystroke, and render or display the data in the same web-page when such data is received from the server. AJAX can create interactive web applications or be used in association therewith. This can make web pages feel more responsive by exchanging small amounts of data with the server behind the scenes, so that the entire web page does not have to be reloaded each time the user makes a change. This is meant to increase the web page's interactivity, speed, and usability.

On mobile devices where computer code providing a XML messaging service and a user interface manger capable of partially reloading a display are available, the web-page or application can utilize this computer code. This functionality is available, for example, in FlashJAX available from FLASH WIDGETS, L.L.C. of Garland, Tex. Mobile phones supporting Adobe FLASH LITE (formerly Macromedia FLASH LITE) or a full version of Adobe FLASH (formerly Macromedia FLASH) available from Adobe Systems Incorporated of San Jose, Calif. also provide this functionality. Example of mobile PCs providing this kind of functionality include a Pocket PC 3000, a Windows CE mobile device, or a Adobe FLASH enabled mobile device.

FlashJAX is a search engine that utilizes Adobe FLASH and AJAX technology to provide the end user with instant results, or results that appear to be instantaneous. Each keystroke creates an SQL query that is sent through PHP to MYSQL and then compiles a dynamic RSS file through a PHP script that is brought back into Adobe FLASH to populate a data-grid with the search results.

XML messaging can be provided by protocols such as SOAP or XML RPC. SOAP is a protocol for exchanging XML-based messages over a computer network, normally using HTTP. SOAP forms the foundation layer of the Web services stack, providing a basic messaging framework that more abstract layers can build on. There are several different types of messaging patterns in SOAP.

In one embodiment, the suggestive search can query two or more databases simultaneously with each keystroke. Preferably, the first database queried is a general database as discussed herein and the second or additional database can be queried for sponsored results or advertisers. Thus, targeted advertising can be associated with general database searches in this manner.

In another preferred embodiment, the results can be ranked by the database returning the results. So results from databases ranking higher, e.g., sponsor databases, advertiser databases, can be displayed in a prominent way. A myriad of display arrangement methods can be used to organize the display by rank. Examples include, but are not limited to, changing the background color of the search result, changing a splash around the result, rendering the result with motile graphics (i.e., graphics comprising portions within that are capable of movement), or reserving a display area for sponsored results, or any combination thereof.

By way of example, a search for "pizza delivery" can provide search results from one or more preferred pizza providers and general contact information. The advertising database(s) serve up content to the mobile user, preferably displayed in a prominent way as compared to the general search engine results. If user location information is available or provided to the search engines, the location information can be provided to the sponsoring databases, thus allowing a sponsoring database to provide user location specific results. These sponsored results can also be provided with the added functionality of click to call when on a mobile phone device. This can advantageously permit the mobile user to perform a search, rapidly select a sponsored result, and with one click call that sponsor. The search engine can decipher a local vendor to call for a regional or national advertiser, for example, a local franchise of a national chain sponsor can be called (e.g., Ledo's Pizza®, Armand's Pizza®, or the like). If no location information for a user is available, a remote server can make a best-guess for a user's location, e.g., based on an algorithm or one or more other pre-selected preferences. In a preferred embodiment, an area code and exchange of the mobile device can be mapped to a geographic location using methods well known in the art. After deriving the location, the results can be customized for a mobile user as described above.

A Preferred Embodiment

A preferred product application is optimized to run with the latest Adobe FLASH LITE player (e.g., version 2.0) on mobile devices and the backend is optimized to run with PHP or ASP coded backend connecting to one or more web-based XML, RSS, or SQL database feeds. When programmed in Adobe FLASH LITE, a mobile device search script can be smaller than about 20 Kilobytes (KB), or less than about 15 KB, or even less than about 9 KB. The search script the mobile device calls on the network can vary in size. At present, a bare-bones live suggestive search engine has been implemented in only about 9 KB using Adobe FLASH LITE. In such an implementation, most of the intelligence in the search page can be provided on the server-side. The data sent in response to a search is also preferably compressed, because of typically limited bandwidth on most Mobile Services. Many mobile devices limit communications to the mobile device to be limited in size to, for example, 64 KB. The server-side script can be written to consider such limitations.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined by the appended claims.

What is claimed is:

1. A method of communicating from a mobile device using a computer program, the method comprising:
   communicating, using a client-side script resident on the mobile device, a keystroke to a remote server via a network upon detecting the keystroke in a text input area of a search portion of a user-interface page;
   processing the keystroke at the remote server using a server-side script, wherein processing the keystroke includes parsing data from at least one web-based data repository or stream neither of which is based on a prior search;
   compiling the data parsed from the at least one web-based repository or stream into a dynamic extensible markup language (XML) stream using asynchronous javascript and XML (AJAX);
   receiving the dynamic XML stream containing the data parsed from the at least one web-based repository or stream from the remote server via the network in response to the remote server processing the keystroke;
   processing, using the client-side script, the received dynamic XML stream containing the data parsed from the at least one web-based repository or stream;
   displaying on the mobile device after each keystroke at least a portion of the data parsed from the at least one web-based repository or stream on the user-interface-page by reloading less than the entire user-interface page; and
   repeating the communicating, the processing, the receiving, and the displaying with each keystroke in the text input area of the search portion of the user-interface page until the detected keystroke in the text input area of the search portion of the user-interface page comprises a submit command keystroke;
   wherein the network comprises a telecommunications wireless network.

2. The method of claim 1, wherein the keystroke conveys a displayable character.

3. The method of claim 2, wherein the displayable character comprises an alpha-numeric character.

4. The method of claim 1, wherein the mobile device comprises a handheld computer device that communicates via the network using one or more radio frequencies.

5. The method of claim 1, wherein the handheld device comprises at least one of a wireless phone, a wireless email device, a personal desktop assistant, and a pocket personal computer.

6. The method of claim 1, wherein the communicating of the keystroke and the receiving of the data use asynchronous communications.

7. The method of claim 1, wherein the user-interface-page comprises a suggestive search page and the displayed portion of the data comprises one or more predictive key words or phrases.

8. The method of claim 7, wherein the displayed portion of the data comprises an estimated count of search results.

9. The method of claim 7, wherein the search page searches at least one of a web-page keyword, a directory, a dictionary, a product listing, a news feed, a games listing, a movie theater listing, a movie rental listing, a phone directory, a ring tone listing, a video rental listing, a classified advertisement, and a combination thereof.

10. The method of claim 1, wherein the user-interface page comprises a web-page and the remote server comprises a web-server.

11. The method of claim 1, wherein the received dynamic XML stream includes data from at least two associated databases.

12. The method of claim 11, wherein a first database comprises general search result information and a second database comprises sponsored search result information.

13. The method of claim 12, wherein the displayed portion of the data comprises a plurality of sponsored information and general information.

14. The method of claim 13, wherein the displayed portion of the data is ranked and then displayed by rank.

15. The method of claim 1, wherein the received dynamic XML stream is less than about 64 kilobytes in size.

16. A method of communicating from a mobile device using a computer program, the method comprising:
   asynchronously communicating a keystroke to a remote server via a network upon detecting the keystroke in a text input area of a suggestive search page of the mobile device;
   processing the keystroke at the remote server, wherein processing the keystroke includes parsing data from at least one web-based data repository or stream neither of which is based on a prior search of the suggestive search page by creating a structured query language (SQL) query and compiling a dynamic really simple syndication (RSS) file with the data from the at least one web-based data repository or stream;
   asynchronously receiving the parsed data from the remote server via the network in response to the remote server processing the keystroke;
   processing the parsed data received from the remote server; and
   displaying in the text input area of the suggestive search page on the mobile device after each keystroke at least a portion of the parsed data on the suggestive search page by reloading less than the entire suggestive search page;
   repeating the communicating, the processing, the receiving, and the displaying with each keystroke in the text input area of the suggestive search page such that the portion of the parsed data displayed on the suggestive search page is continually updated with each keystroke in the text input area of the suggestive search page until the keystroke comprises a submit command keystroke.

17. The method of claim 16, wherein the displayed portion of the data comprises one or more predictive key words or phrases.

18. The method of claim 16, wherein the user-interface page comprises a web-page and the remote server comprises a web-server.

19. The method of claim 16, wherein the mobile device comprises a handheld computer device that communicates via the network using one or more radio frequencies.

20. The method of claim 19, wherein the handheld device comprises at least one of a wireless phone, a wireless email device, a personal desktop assistant, and a pocket personal computer.

21. The method of claim 20, wherein the handheld device comprises a wireless phone and the method further comprises selecting a desired portion of the data comprising a person or a business and asynchronously communicating a second keystroke to initiate a wireless telephone call thereto.

22. The method of claim 16, wherein the search page searches at least one of a web-page keyword, a directory, a dictionary, a product listing, a news feed, a games listing, a movie theater listing, a movie rental listing, a phone directory, a ring tone listing, a video rental listing, a classified advertisement, and a combination thereof.

23. The method of claim 16, wherein the detected keystroke comprises a mouse event, a window selection, or a keystroke.

24. The method of claim 16, wherein the remote server compresses the data prior to being received by the mobile device.

25. The method of claim 1, wherein the at least one web-based data repository or stream is selected from the group consisting of a database, an XML feed, and an RSS feed.

26. The method of claim 1, wherein the at least one web-based data repository or stream is a database, and wherein the data parsed from the database is selected from the group of data consisting of web-page keywords, directory listings, product listings, news feeds, advertisements, and combinations thereof.

27. A method of performing a web-based search from a mobile device, the method comprising:
asynchronously communicating a first keystroke from the mobile device to a remote server via a telecommunications wireless network upon a keystroke listener resident on the mobile device detecting the first keystroke in an input area of a suggestive search page;
processing the first keystroke at the remote server, wherein processing the first keystroke includes parsing a first set of suggestive search terms from at least one web-based data repository or stream by using an asynchronous javascript and extensible markup language (AJAX) script resident on the remote server to access the at least one web-based data repository or stream and generate a first compiled extensible markup language (XML) file, wherein the at least one web-based data repository or stream is selected from the group consisting of a database, an XML feed, and an RSS feed and wherein the at least one web-based data repository or stream is not based on a prior search;
asynchronously receiving the first compiled XML file from the remote server at the mobile device via the telecommunications wireless network in response to the remote server processing the first keystroke;
processing the first compiled XML file at the mobile device to extract the first set of suggestive search terms;
displaying on the mobile device after the first keystroke at least a portion of the first set of suggestive search terms in the input area on the suggestive search page by reloading less than the entire suggestive search page;
asynchronously communicating a second keystroke from the mobile device to the remote server via the telecommunications wireless network upon the keystroke listener detecting the second keystroke in the input area of the suggestive search page;
processing the second keystroke at the remote server, wherein processing the second keystroke includes parsing a second set of suggestive search terms from the at least one web-based data repository or stream by using the AJAX script resident on the remote server to access the at least one web-based data repository or stream and generate a second compiled extensible markup language (XML) file, the second set of suggestive search terms being a subset of the first set of suggestive search terms;
asynchronously receiving the second compiled XML file from the remote server at the mobile device via the telecommunications wireless network in response to the remote server processing the second keystroke;
processing the second compiled XML file at the mobile device to extract the second set of suggestive search terms; and
displaying on the mobile device after the second keystroke at least a portion of the second set of suggestive search terms in the input area on the suggestive search page by reloading less than the entire suggestive search page.

28. The method of claim 27, wherein the at least one web-based data repository or stream comprises a database, and wherein the first and second sets of suggestive search terms parsed from the database include web-page keywords, directory listings, product listings, news feeds, advertisements, or combinations thereof.

* * * * *